J. C. INGHAM & C. COLBY.
Covers for Fruit-Baskets.

No. 141,142.  Patented July 22, 1873.

Witnesses
John A. Ellis
C. Alexander

Inventor's
C. Ingham and
C. Colby
per
J. H. Alexander & Co.
Atty's

UNITED STATES PATENT OFFICE.

JOHN C. INGHAM AND CHARLES COLBY, OF BENTON HARBOR, MICHIGAN.

IMPROVEMENT IN COVERS FOR FRUIT-BASKETS.

Specification forming part of Letters Patent No. 141,142, dated July 22, 1873; application filed June 6, 1873.

*To all whom it may concern:*

Be it known that we, JOHN C. INGHAM and CHARLES COLBY, of Benton Harbor, in the county of Berrien and State of Michigan, have invented certain new and useful Improvements in Fruit-Basket; and we do hereby declare that the following is a full, clear, and exact description thereof, reference being had to the accompanying drawings and to the letters of reference marked thereon, which form a part of this specification.

The nature of our invention consists in the construction and arrangement of a cover for fruit-baskets, as will be hereinafter more fully set forth.

In order to enable others skilled in the art to which our invention appertains to make and use the same, we will now proceed to describe its construction and operation, referring to the annexed drawing, in which—

Figure 1:
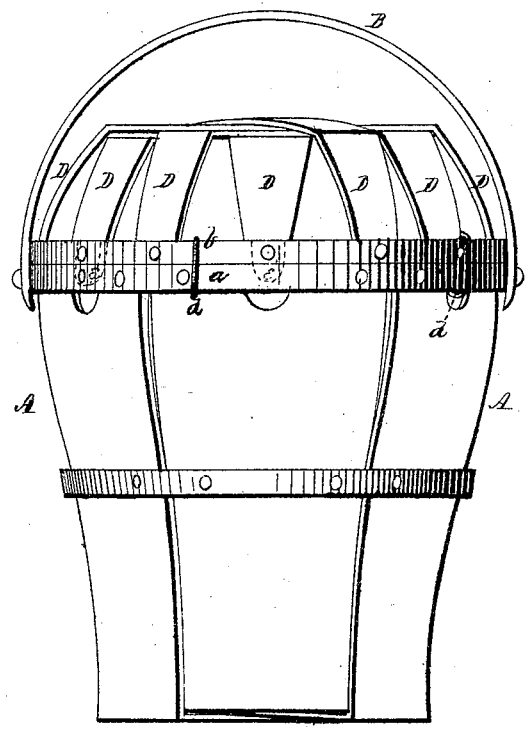
Figure 2:
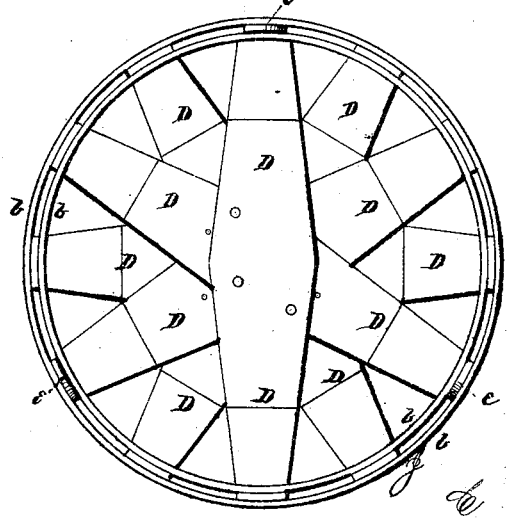

Figure 1 is a side view of a fruit-basket and handle with our cover placed on the same, and Fig. 2 is a bottom view of the cover.

A represents a fruit-basket, constructed in any suitable manner, and provided with a bail or handle, B. Around the upper edge of the basket A are hoops $a\ a$, one on the inside and the other on the outside. The cover is formed of a series of scored or grooved strips, D D, laid across each other in star-form, and tacked or otherwise fastened together. The ends of the strips D D are then bent downward and secured between hoops $b\ b$, of the same size as the upper end of the basket. The cover thus made is in the shape of an inverted pan, with inclined sides, but these sides are open, so as to show the fruit to good advantage. It is strong and durable, and conforms to the shape of a heaped basket of fruit.

It is fastened to the basket by means of wires $d\ d$, or some of the strips D may have tenons or projections $e\ e$ formed on their ends to extend below the hoops $b\ b$, and be inserted between the basket-hoops $a\ a$, and fastened by tacks.

Either or both of these fastenings may be used at will.

This cover also enables parties in shipping fruit to stack them one above another, without injury to the fruit in the basket below, which has always been a serious difficulty in the transportation of fruit.

Having thus fully described our invention, what we claim as new, and desire to secure by Letters Patent, is—

The within-described cover for fruit-baskets, composed entirely of strips D D and hoops $b\ b$, said strips being weakened a suitable distance above the hoops, and bent one upon the other, thus forming an open and elevated cover with flattened top, as and for the purpose set forth.

In testimony that we claim the foregoing as our own we affix our signatures in presence of two witnesses.

J. C. INGHAM.
C. COLBY.

Witnesses:
GEO. W. TOLES,
T. M. SMITH.